United States Patent [19]

Cronin

[11] 4,100,586
[45] Jul. 11, 1978

[54] TUNGSTEN LAMP CIRCUIT FOR CURRENT LIMITING AND FAULT INDICATION

[75] Inventor: Michael Joseph Cronin, Sherman Oaks, Calif.

[73] Assignee: Lockheed Aircraft Corporation, Burbank, Calif.

[21] Appl. No.: 755,657

[22] Filed: Dec. 30, 1976

[51] Int. Cl.² .................................................. H02H 3/16
[52] U.S. Cl. ............................................ 361/58; 323/21; 340/650
[58] Field of Search ..................... 361/58, 93, 98, 57, 361/55, 54, 105, 106; 323/21, 9; 315/119, 120, 65, 64, 67, 69, 127, 129, 133, 134, 291, 307, 309, 311; 340/253 A, 253 R, 252 R, 255

[56] References Cited

U.S. PATENT DOCUMENTS

| | | | |
|---|---|---|---|
| 2,448,493 | 8/1948 | Meno et al. | 315/65 |
| 2,736,884 | 2/1956 | Yeomans | 340/253 A |
| 3,074,013 | 1/1963 | Bowden | 340/252 R |
| 3,365,612 | 1/1968 | Schierholt | 315/119 |
| 3,529,210 | 9/1970 | Toshioito et al. | 361/58 |

*Primary Examiner*—Patrick R. Salce
*Attorney, Agent, or Firm*—Ralph M. Flygare

[57] ABSTRACT

A current limiting and fault indicating circuit for connection between a load and a source of electrical current including a pair of tungsten lamp filaments connected in parallel. The lamp filaments are chosen so that the current drawn by the load during the normal operation of the load produces only a small voltage drop. In the event of an overload or a short circuit, however, the increased current flow through the lamp filaments will heat the filaments to incandescence and the non-linear increase in impedance will absorb the source voltage and indicate the circuit to malfunction by the emission of bright light. The current flowing as a result of the fault will be limited to the rated current of the lamps. Since the rated current of the lamps may be high relative to the normal load current to minimize the voltage drop across the lamps under normal conditions, further limiting the flow of current through the circuit in the event of a short circuit may be achieved through the use of two lamp filaments of different characteristics, i.e., a high wattage-low voltage filament and a low wattage-high voltage filament. The high wattage-low voltage filament can be automatically switched out of the circuit in the event of a fault to force all of the fault current through the low wattage filament. The fault current can thus be limited to the rated current of the low wattage filament. Even this current will be sufficient to raise the filament to incandescence indicating the existence of the fault. The two lamp filaments may be enclosed within a single glass envelope which may be filled with an inert gas at atmospheric pressure to effect cooling of the filaments under normal current conditions. A resettable remote status indicator lamp may be included in the circuit to indicate the existence of an intermittent short circuit.

21 Claims, 8 Drawing Figures

TUNGSTEN LAMP CIRCUIT FOR CURRENT LIMITING AND FAULT INDICATION

BACKGROUND OF THE INVENTION

The present invention relates generally to current limiting and fault indicating circuits and more specifically to circuits with dual current limiting devices such as tungsten lamps and transistors in lieu of circuit breakers for currents ranging from fractions of an amphere to about three ampheres.

Electrical circuits have generally included some form of protection against the unrestricted flow of current resulting from the occurrence of a short circuit. Oftentimes, this protection takes the form of a common fuse which completely interrupts the flow of current in the event of a short circuit. The fuse must then be replaced to restore current in the electrical circuit. Circuit breakers may also provide protection for electrical wiring against current overloading. However, circuit breakers are generally electro-mechanical or electro-magnetic devices which must be reset to restore the flow of current in the circuit. In the event of a short circuit, a circuit breaker may "hang up" and fail to open the circuit due to a welding of the contacts or mechanical binding of the contact mechanism and thus cause a smoke or fire hazard.

Circuits including two or more lamp filaments connected in parallel have been useful for indicating short circuits in low power systems. A circuit of this type, for example, is disclosed in U.S. Pat. No. 3,074,013 issued to R. N. Bowden. The lamp filaments in these circuits simultaneously indicate the existence of a short circuit and limit the current that may flow through the short circuit. In the event of a short circuit, however, these circuits do not limit the current that may flow through the circuit below the level of current flow permitted by the lamps in the absence of a short circuit.

Accordingly, it is an object of the present invention to provide a novel method and circuit having a pair of current limiting devices connected in parallel to both indicate the existence of an overcurrent fault and to limit the current that may flow through a short circuit to a level below the level of current flow permitted by the circuit in the absence of a short circuit.

Another object of the present invention is to provide a novel method and current limiting and fault indicating circuit having a high voltage-low current device and a low voltage-high current device connected in parallel in which the low voltage-high current device is automatically removed from the circuit in the event of a short circuit.

Still another object of the present invention is to provide a novel method and current limiting and fault indicating circuit having a remote status indication of the existence of a short circuit.

These and many other objects and advantages of the present invention will be readily apparent to one skilled in the art to which the invention pertains from the claims and from the perusal of the following detailed description in connection with the appended drawings.

THE DRAWINGS

DETAILED DESCRIPTION

Figure 1:
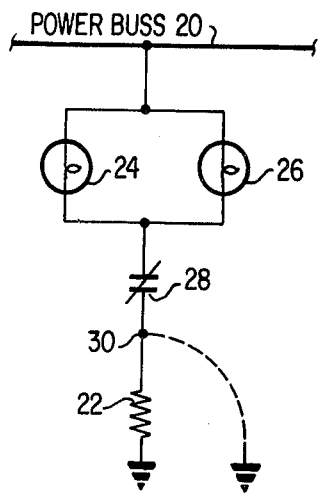
FIG. 1 is a schematic wiring diagram of an embodiment of the current limiting and fault indicating circuit of the present invention utilizing two lamps.

With reference to FIG. 1, where a simple embodiment of the current limiting and fault indicating circuit is illustrated as running between a conductor or bus 20 to which electrical power is supplied and a load 22, the load 22 may include any of a variety of electrical devices such as relay coils, instruments, small actuators, lights, etc.

The circuit may include a pair of tungsten filament lamps 24 and 26 connected in parallel with each other and in series with a pair of normally closed contacts 28. In this and Ser. Nos. 755,656; 755,557; 755,558; 755,559; and, 755,560 applications filed concurrently herewith, the normal state of contacts will be that of an energized and normally operating system and may be different from that of the contacts when the system is deenergized. In the environment of an aircraft, for example, the contacts 28 would not close until the energization of the system.

The lamps 24 and 26 may each include a single tungsten lamp filament and may be chosen as a function of the impedance of the load 22 so that the lamps operate in a heated but low impedance mode with the normal current through the lamps. When so operated, the voltage drop will be relatively small and the lamps will not emit visible light. Upon the occurrence of a short circuit schematically illustrated at point 30, however, both of the lamp filaments 30 and 32 will emit a bright, visible light as the current flowing through the lamps increases to thereby indicate the existence of the short circuit.

In addition to indicating the existence of the short circuit in the circuit as described above, the filaments of the lamps 24 and 26 together limit the current that may flow in the circuit as a result of the short circuit. In this way, the lamp 24 and 26 obviate the need for a circuit breaker or fuse for the load 22. In the event of the failure of one of the lamps 24 or 26, the other lamp will still perform the current limiting and fault indicating functions of the circuit. The reliability of the circuit is thus greatly increased. By knowing the impedance of the load 22 and the voltage applied to the bus 20, the lamps may be chosen so that the current flowing therethrough will be sufficient to power the load 22 with only a low voltage drop across the lamps, i.e., a ratio of rated lamp current to load current between about 4:1 to 20:1 or more.

Although the lamps 24 and 26 do not normally emit visible light, they may nevertheless be maintained at a warm temperature. Consequently, for certain values of current resistance of the lamps to shock and vibration is increased, and the life of the filaments should be considerably increased. Moreover, the low initial impedance of the lamp as a non-linear load is increased thereby reducing the effects of transients imposed on the bus 20.

In the event of a short at point 30, the lamps 24 and 26 will begin to glow and the current through the filaments will be limited to a value proportional to the lamp wattage. For example, if the voltage supplied to the bus 20 is 28 volts d.c. and if each of the lamps is rated at 75 watts, the current flowing through each of the filaments will be limited to about 2.7 amps for a total of 5.4 amps.

Figure 2:
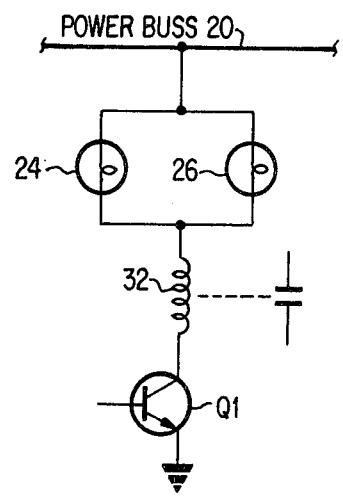
FIG. 2 is a schematic wiring diagram of a second embodiment utilizing a solid state switch.

As illustrated in FIG. 1, the switch contacts 28 may be controlled from a remote location. In other embodiments such as that illustrated in FIG. 2 where like elements have been accorded like numerical designations, the current through the relay coil 32 may be interrupted by the operation of a suitable electronic switch such as the illustrated NPN transistor Q1.

As discussed above and in addition to providing current before a two-volt drop is reached limiting, the lamps 24 and 26 are also useful in decreasing the effects of voltage surges on the bus 20. Because of the non-linear resistance of the lamp filaments with respect to changes in their temperature, the lamps will tend to attenuate a voltage surge. In the event of a sudden decrease in the voltage applied to the conductor 20, the voltage drop across the lamps 24 and 26 will be less at the lower voltage than at the normal voltage. For example, a 50-watt rated lamp with a characteristic exponent of 0.55 may have approximately a 1.91 volt voltage drop at 28 volts d.c., but the same filament will have only a 0.66 volt voltage drop if the buss voltage is reduced to 16 volts d.c. The voltage drop across the lamps is therefore self-compensating with variations in the power supply.

The amount of current that will flow through a lamp at a particular voltage may be determined by knowing the lamp exponent. The lamp current $I_L$ is related to the lamp voltage by the formula:

$$I_L = \left(\frac{V_L}{V_R}\right)^x (I_R) \quad (1)$$

Where:
$I_L$ = lamp current;
$V_L$ = lamp voltage;
$I_R$ = rated lamp current;
$V_R$ = rated lamp voltage; and,
X = lamp exponent.

The value of the lamp exponent depends upon the particular lamp geometry and the type of gas present in the envelope. Assuming a lamp exponent value of 0.55 and that the voltage drop across the lamps 24 and 26 is 2 volts when the voltage of the bus 20 is 28 volts d.c., a 50-watt, 1.78 amp. rated lamp could supply a 0.418 amp. current before a two-volt drop limit is reached. However, a 150-watt rated lamp having the same lamp exponent value could provide a 1.255 amp. current before the same two-volt drop is reached. Assuming that the total rated lamp wattage of the lamps 26 and 28 in FIG. 1 is 150 watts, i.e., two 75 watt lamps, and that the load current is 1.255 amps., the normal heat-wattage dissipation for the lamps 24 and 26 will be only 2.5 watts.

However, if a short circuit occurs, the heat-wattage dissipation for the two lamps rises to 150 watts, and the dissipation of this much heat may be undersirable for many situations.

Figure 3:
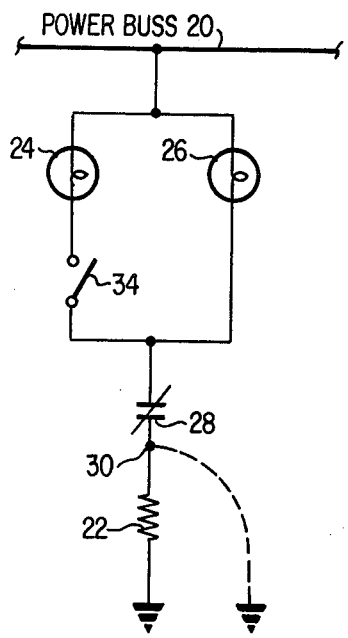
FIG. 3 is a schematic wiring diagram of a third embodiment of the present invention in which one of the two lamps may be selectively removed from the circuit to enhance current limiting characteristics.

To reduce the amount of heat dissipated in the event of a short circuit while maintaining a particular level of current flow in the absence of a short circuit, a temperature or light activated switch may be connected between one of the lamp filaments and the load. Such a switch is illustrated in FIG. 3 as a single pole, single throw switch 34 which is closed to conduct current to the load 22 during normal operation. However, the emission of heat or bright light by the filaments of one or both of the lamps 24 and 26 indicating the existence of a short circuit at point 30 will cause the switch 34 to open and interrupt the flow of current through the lamp 24. Consequently, both the current flowing as a result of the short circuit and the heat dissipated by the lamps in the event of a short circuit will be reduced.

Typically, in aircraft, the bus 20 is connected to a supply of current from between about 0.1 to about 3 amps. at 28 volts d.c. With continued reference to the circuit of FIG. 3, the filament within the lamp 24 may be rated at 7.5 amps. at 10 volts d.c. and the filament within the lamp 26 may be rated at 0.04 amps. at 28 volts d.c. By using lamp filaments of different ratings, it is possible to pass the 7.5 amps. of current without creating an excessive voltage drop across the lamp. For example, the flow of current through the high current-low voltage lamp 24 may be interrrupted by the opening of the switch 34 in the event of a short circuit at point 30. When the switch 30 is open, the current flowing as a result of the short circuit through the circuit is limited to that flowing through the low current-high voltage lamp 26, i.e., 0.04 amps.

As earlier indicated, the switch 34 may be heat or light responsive. For example, a bimetal element may be included within the glass envelope or attached to the exterior thereof or, alternatively, a suitable conventional light responsive element such as a phototransistor may be utilized.

The use of a fault responsive switch 34 greatly reduces the need for the switch contacts 28 inasmuch as the fault current can be significantly reduced and need not be altogether interrupted.

Another advantage of the circuit is that a relay coil may require substantially more current to effect "pull-in" than the current to "hold, " e.g., 10.0 amps. and 0.5 amps., respectively. Thus, the pull-in of the relay can be effected through the current inrush at low lamp temperatures and the holding thereof under the reduced current as the filaments heat.

Figure 4:
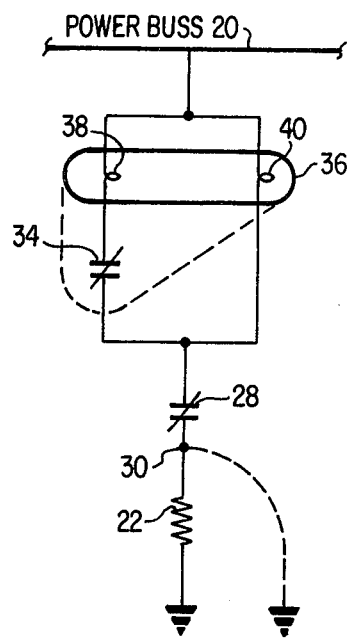
FIG. 4 is a schematic circuit diagram of a forth embodiment of the present invention utilizing two filaments of different values within the envelope of a single lamp.

With reference to the embodiment illustrated in FIG. 4, where like elements have again been accorded like numerial designations, the two filaments of the lamps 24 and 26 of the current limiting and fault indicating circuit of FIG. 3 may be enclosed within the single glass envelope of a lamp 36. To improve the cooling of the lamp filaments, the envelope of the lamp 36 may contain an inert gas such as argon at a pressure of less than one atmosphere. As in the embodiments previously discussed, one of the lamp filaments may be a high current-low voltage filament 38 and the other a low current-high voltage filament 40. The temperature, light or electronically activated switch 34 may be enclosed within the envelope of the lamp 38 and is normally closed to permit the flow of current through both of the filaments 38 and 40. However, in the event of a short circuit at point 30, the opening of the switch 34 would again interrupt the flow of current through the high current-low voltage filament 38 leaving current flowing through only the low current-high voltage or pilot filament 40. This will cause the pilot filament 40 to emit bright visible light indicating the existence of the fault, and will limit the fault current to the rated current of the filament, optical latching may be achieved as discussed subsequently.

The present invention is also of great utility in connection with remote control and status lamps such as discussed in more detail in the copending application Ser. No. 755,558 entitled "Dual Filament Current Limiting and Status Indicating Circuit" filed concurrently herewith, the disclosure of said application being hereby incorporated herein by reference.

Figure 5:
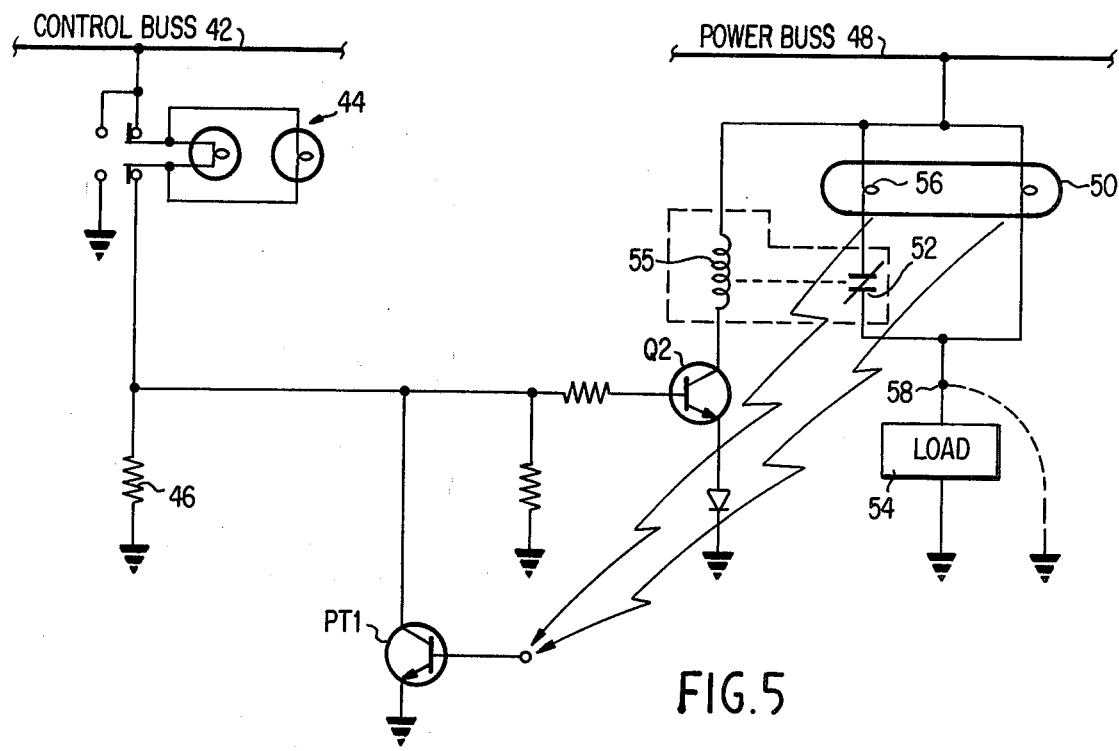
FIG. 5 is a schematic wiring diagram of an embodiment of the present invention employing solid state devices and providing a remote status indication.

Referring now to FIG. 5, the current limiting and fault indicating circuit of the present invention, a control bus 42 may be connected through a dual lamp circuit 44 to a resistor or other load 46 utilized to maintain current flow through the lamps under normal conditions. The control bus 42 may be located, e.g., in the flight station or cabin of an aircraft and may be an extension of a power bus 48 located near the wing roots of the aircraft.

A dual filament lamp 50 with a fault responsive switch 52 may supply power to a load 54 as described above. In addition, the power bus 48 may be connected through a relay coil 55 to the collector electrode of a grounded emitter NPN transistor Q2. Conduction of the transistor Q2 may be controlled by the conduction of a light or heat responsive element such as the illustrated grounded emitter NPN photo-transistor PT1. Conduction of the transistor PT1 in response to the fault current induced incandescence of the lamp 50 will remove the positive bias on the base electrode of the NPN transistor Q2 interrupting the conduction thereof and thereby opening the switch contacts 52 and removing the low voltage-high current filament 56.

In the absence of an overcurrent condition such as a short circuit at point 58, the filaments of the lamp 50 will not emit visible light as a result of the impedance values thereof. Consequently, the photo-transistor PT1 will not conduct. The conduction of the transistor PT1 shunts the current away from the bleed resistor 46 of the current limiting warning lamp switch (CLWL-SW) 44 to indicate the fault condition at the flight station. The conduction of the transistor PT1 which removes the filament 56 from the circuit also effects illumination of the lamp 50 to indicate the existence of the fault at the power bus.

Figure 6:
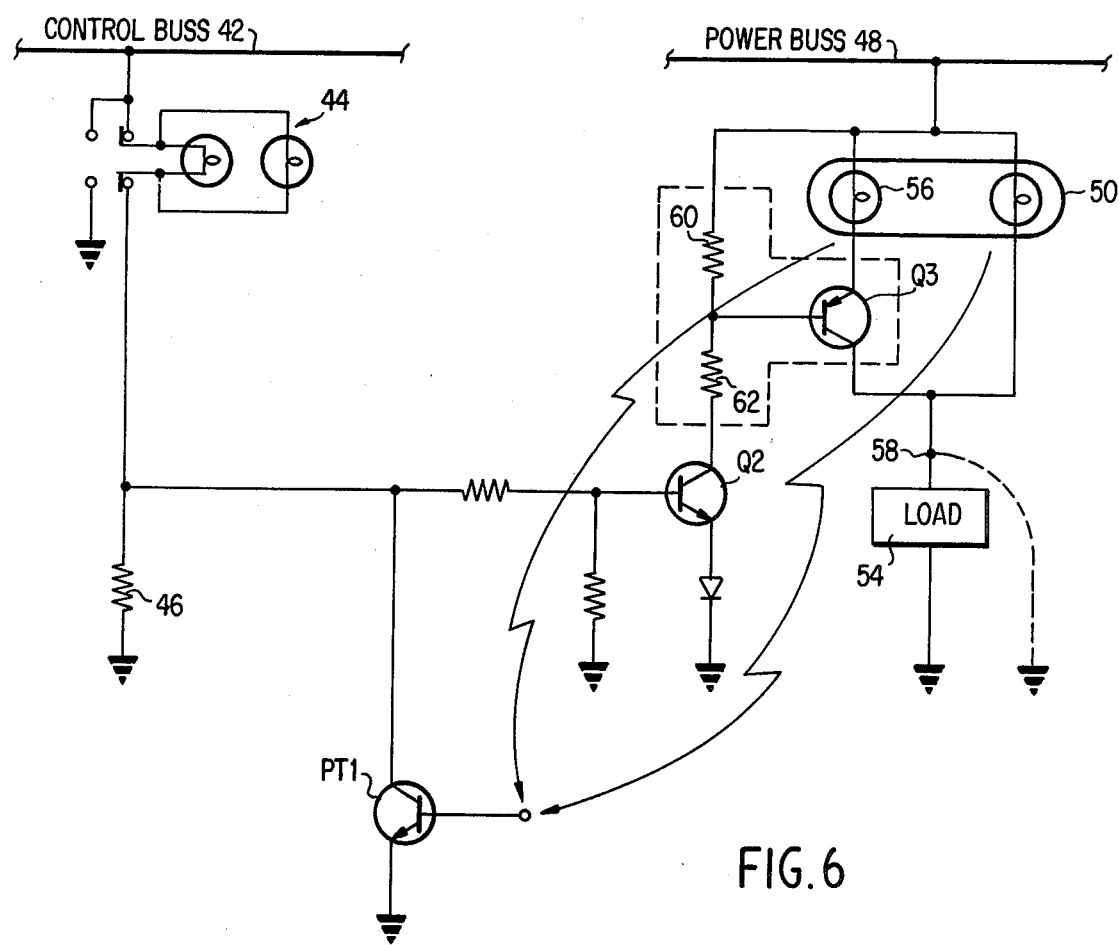
FIG. 6 is a schematic circuit diagram of a further embodiment of the present invention utilizing a solid state switch for disconnecting filament.

A solid state circuit may be used to eliminate the mechanical switch contacts 52 of the relay coil 55 of the circuit of FIG. 5. Referring to FIG. 6, where like elements have been accorded like numerical designations, the circuit may include a PNP transistor Q3 or the like in series with the high current-low voltage lamp filament 56. The base electrode of the transistor Q3 may be connected to a voltage divider network including resistors 60 and 62. The operation of the circuit of FIG. 6 is like that of the circuit of FIG. 5 in that the fault induced incandescence of the lamp 50 will cause the photo-transistor PT1 to conduct and interrupt the conduction of the transistor Q2. The voltage applied to the base electrode of transistor Q3 will rise interrupting the conduction of the transistor Q3 and thereby remove the low voltage high current filament 56 from the circuit.

A remote indication of the fault may still be given by the shunting of the load 46 of the CLWL-SW 44 as earlier explained.

The circuit of FIG. 6 may be made to latch to warn the pilot of an intermittent short circuit.

Figure 7:
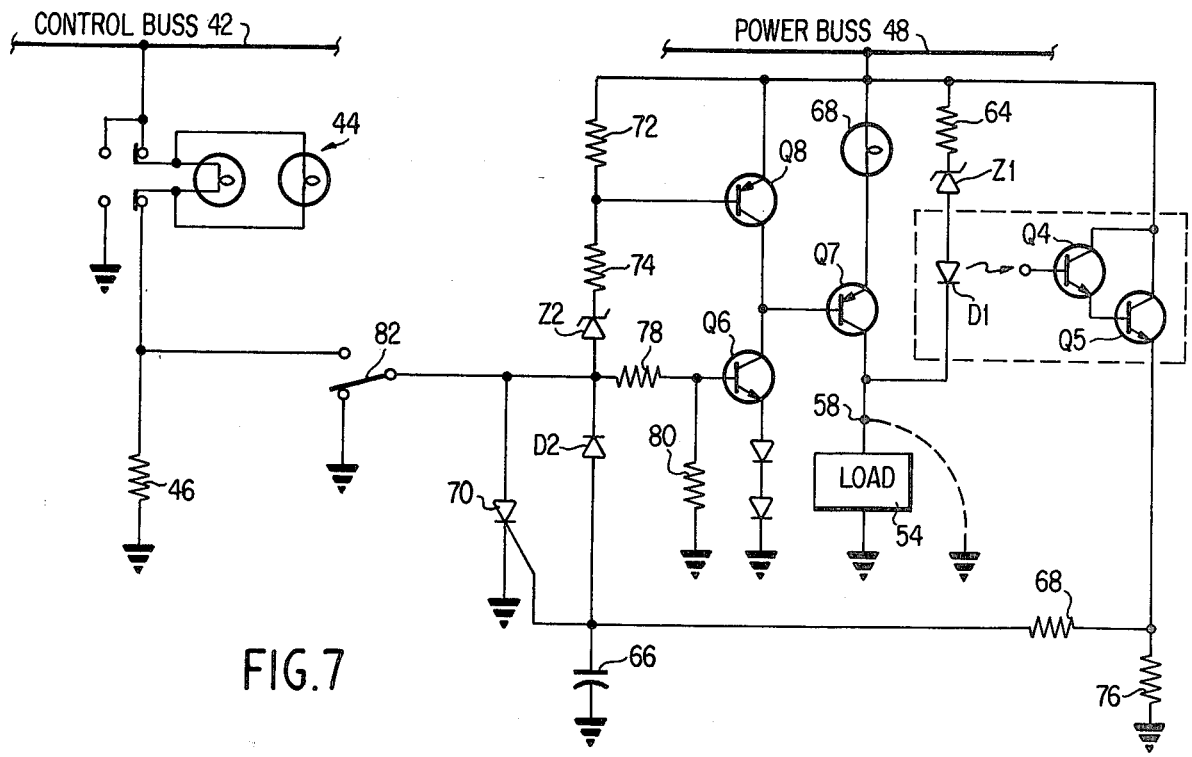
FIG. 7 is a schematic circuit diagram of an embodiment of the present invention having a latching feature; and, FIG. 8 is a schematic wiring diagram of a further embodiment of the present invention utilizing a LASCR to effect latching.

With reference to FIG. 7, where like elements have been accorded like numerical designations, one of the filaments of the lamp 50 may be replaced by the series combination of a resistor 64, a Zener diode Z1 and a light emitting diode D1. The existence of an overcurrent condition will effect the breakdown of the Zener diode Z1 to pass sufficient current through the light emitting diode D1 to effect conduction of the transistor Q4 and Q5 and the charging of the capacitor 66 through the resistor 68 to a potential sufficient to trigger the silicon controlled rectifier SCR 70 into conduction.

The conduction of the SCR 70 will remove the conduction biasing potential from the base electrode of an NPN transistor Q6 which will in turn raise the potential applied to the base electrode of an PNP transistor Q7 sufficiently to drive the transistor Q7 into cut off and remove the power from the load 54.

To insure the cut off of the transistor Q7, a PNP transistor Q8 may be connected between the bus 48 and the base electrode of the transistor Q7. The conduction of the SCR 70 will raise the potential applied across the series connected resistors 72 and 74 and the Zener diode Z2 effecting the breakdown of the Zener diode Z2 and reducing the potential on the base electrode of the transistor Q8 sufficiently to effect the conduction thereof. The conduction of the transistor Q8 will, as a result of the voltage drop across the lamp 68, raise the potential applied to the base electrode of the transistor Q7 above that of the emitter electrode thereof, thereby reverse biasing the transistor Q7 to insure a positive cut off.

Latching of the circuit is achieved by the use of the SCR 70 since removal of the triggering potential as a result of the discharge of the capacitor 66 through the resistor 68 and through the diode D2 and the resistors 78 and 80 will not effect cut off of the SCR 70. This latch can be removed only by the removal of the positive anode to cathode bias supplied through the CLWL-SW 44. A manually controlled switch 82 may be provided for this purpose.

Figure 8:
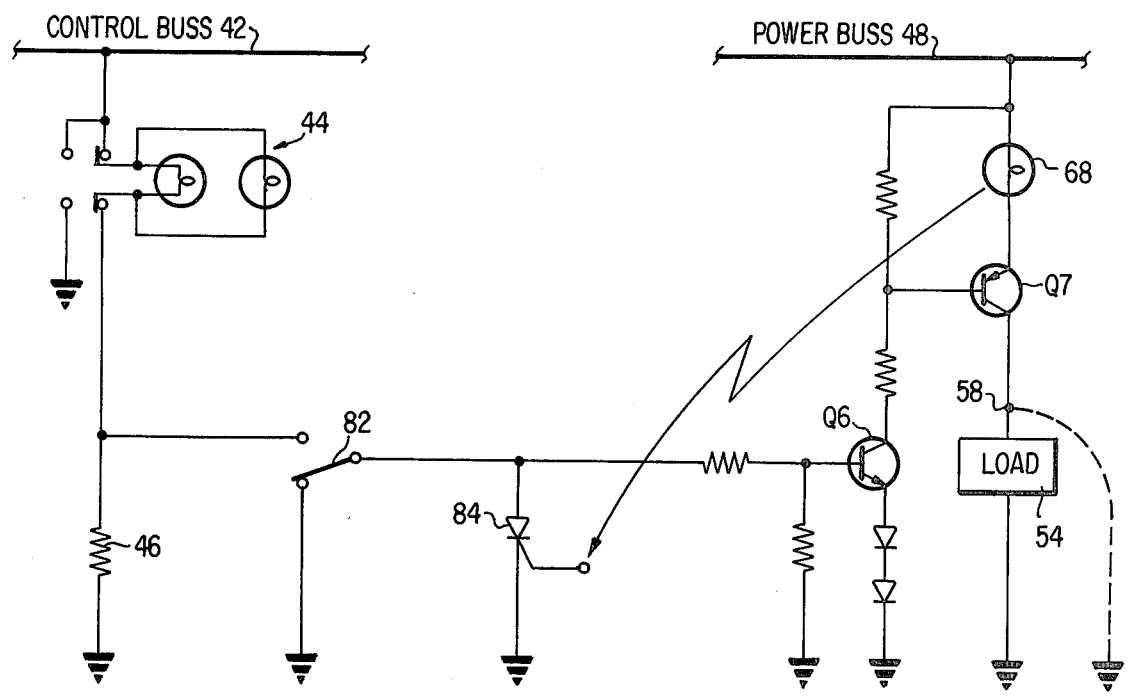

A somewhat simpler latching circuit can be obtained by the use of a light activated silicon controlled rectifier (LASCR) having its light responsive control electrode positioned in proximity to the lamp. As shown in FIG. 8, where like elements have been accorded like numerical designations, the fault responsive emission of light by the lamp 68 will trigger the LASCR 84 into conduction, interrupt the conduction of the transistor Q6 and effect cut off of the transistor Q7 to remove power from the load 54. As a result of the conduction of the LASCR 84, CLWL SW 44 will continue to emit visible light indicating the existence of the fault even if the fault is temporary or subsequently corrected because the LASCR 84, once triggered, does not require continuous illumination to remain in conduction.

The CLWL SW 44 may be turned off only by rendering the LASCR 84 nonconducting through the grounding of the switch 82 as earlier described or by depressing the CLWL SW 44.

The triggering of the LASCR may, of course, be accomplished in response to any excessive voltage drop across the low voltage lamp. By appropriate selection of the Zener diodes, the circuit may be set to trip out any predetermined level of overcurrent. This is possible because the lamp will provide a voltage analog of the current in the load 54.

A further benefit is obtained by using a transistor as the switch in series with the lamp because the transistor is itself a current limiting device, the collector current being a function of the base drive current. Thus, the lamp protects the transistor against the transient of a full short circuit and the transistor protects the lamp against overvoltage.

The present invention may thus be embodied in other specific forms without departing from the spirit or essential characteristics thereof. The presently disclosed embodiments are therefore to be considered in all respects as illustrative and not as restrictive, the scope of the invention being indicated by the appended claims rather than by the foregoing description, and all changes which come within the meaning and range of equivalency of the claims are therefore intended to be embraced therein.

What is claimed is:

1. A current limiting and fault indicating circuit comprising:
   first and second power supply terminals;
   a load having first and second load terminals, said first load terminal being connected to said first power supply terminal;
   first and second lamp filament means connected in parallel between said second power supply terminal and said second load terminal for limiting the flow of current through said fault indicating circuit in the event of a short circuit, for indicating the occurrence of the short circuit by the emission of visible light, and for indicating the status of said lamp filament means; and
   switching means for effectively removing one of said lamp filament means from the circuit in response to the occurrence of a short circuit thereby further limiting the flow of current through the circuit as a result of the short circuit.

2. The circuit of claim 1 wherein said switching means includes a thermally responsive switch in proximity to said lamp filament means so as to be responsive to the thermal output therefrom.

3. The circuit of claim 1 wherein said switching means includes a light responsive switch in proximity to said lamp filament means so as to be responsive to the light output therefrom.

4. The circuit of claim 1 wherein said first lamp filament means includes a high voltage-low current lamp filament and wherein said second lamp filament means includes a low voltage-high current lamp filament.

5. The circuit of claim 4 including means for remotely indicating the existence of a short circuit in response to said lamp filament means.

6. The circuit of claim 5 including means for latching said remote indicating means to thereby increase the likelihood of the detection of an intermittent short circuit.

7. The circuit of claim 6 wherein said switching means includes a light responsive switch in proximity to said lamp filament means so as to be responsive to the light output therefrom.

8. The circuit of claim 7 wherein said first and second lamp filament means are contained within a single envelope.

9. The circuit of claim 4 wherein said first and second lamp filament means are contained within a single envelope.

10. The circuit of claim 9 wherein said envelope contains an inert gas.

11. A circuit comprising:
    an input terminal adapted to receive current;
    a load;
    a switch;
    a dual filament lamp connected between said input terminal and said load, one of said dual filaments being connected parallel to the series connection of the other of said dual filaments and said switch, said switch being operatively responsive to said lamp;
    a second switch responsive to said lamp; and,
    an indicator remote from said lamp and controlled by said second switch.

12. The circuit of claim 11 wherein said dual filaments have significantly different impedance characteristics.

13. A current limiting and fault indicating circuit comprising:
    first and second power supply terminals;
    a load having first and second load terminals, said first load terminal being connected to said first power supply terminal;
    a first lamp filament connected between said second power supply terminal and said second load terminal;
    a second lamp filament;
    a first solid state switch means including a control terminal, said second lamp filament and said first solid state switch means being connected in series between said second power supply terminal and said second load terminal; and,
    a second solid state switch means connected in series between said first power supply terminal and said control terminal for controlling the conduction of said first solid state switch means in response to either said first or second lamp filament.

14. The circuit of claim 13 including:
    a remote indicator, connected between said second power supply terminal and said second solid state switch means, the operation of said remote indicator being responsive to one of said first and second lamp filaments.

15. The circuit of claim 13 wherein said first solid state switch means is self latching.

16. A current limiting and fault indicating circuit comprising:
    first and second power supply terminals;
    a load having first and second terminals;
    a first circuit portion including a lamp filament and a first solid state switch connected in series between said second power supply terminal and said second load terminal;
    a second circuit portion connected between said second power supply terminal and said second load terminal and including a series impedance;
    a second solid state switch operable in response to a bias signal applied thereto to open said second solid state switch; and
    a third solid state switch for controlling the bias signal applied to said second solid state switch in response to the condition of at least one of said circuit portions.

17. The circuit of claim 16 including a remote indicator controlled by said third solid state switch and wherein said third solid state switch is self latching.

18. The circuit of claim 17 wherein said third solid state switch is responsive to the condition of said second circuit portion; and said second circuit portion includes a zener diode in series with said series impedance.

19. The circuit of claim 17 wherein said third switch is responsive to said lamp filament in said first circuit portion.

20. In combination in a current limiting and fault indicating circuit:
   an input terminal;
   a load;
   a lamp filament and a solid state switch connected in series between said input terminal and said load;
   an impedance element connected at an intermediate point to a control element of said first switch;
   a second solid state switch connected to said input terminal through said impedance element for controlling said first switch;
   a remote indicator; and
   a third solid state switch connected to control said second switch and said remote indicator and responsive to said lamp filament.

21. The combination of claim 20 wherein said third switch is a light activated silicon control rectifier responsive to light from said lamp filament and is self latching.